US010926643B2

(12) United States Patent
Yang et al.

(10) Patent No.: US 10,926,643 B2
(45) Date of Patent: Feb. 23, 2021

(54) ELECTRIC CHARGER SYSTEM FOR ELECTRIC OR HYBRID VEHICLE

(71) Applicant: Valeo Siemens eAutomotive France SAS, Cergy (FR)

(72) Inventors: Gang Yang, Courbevoie (FR); Boris Bouchez, Cergy (FR)

(73) Assignee: VALEO SIEMENS EAUTOMOTIVE FRANCE SAS, Cergy (FR)

( * ) Notice: Subject to any disclaimer, the term of this patent is extended or adjusted under 35 U.S.C. 154(b) by 329 days.

(21) Appl. No.: 15/941,493

(22) Filed: Mar. 30, 2018

(65) Prior Publication Data

US 2018/0281609 A1    Oct. 4, 2018

(30) Foreign Application Priority Data

Apr. 3, 2017    (FR) ...................................... 1752862

(51) Int. Cl.
| | |
|---|---|
| *H01M 10/46* | (2006.01) |
| *B60L 11/18* | (2006.01) |
| *H02M 3/158* | (2006.01) |
| *H02J 7/02* | (2016.01) |
| *H02M 3/28* | (2006.01) |

(Continued)

(52) U.S. Cl.
CPC ........... *B60L 11/1812* (2013.01); *B60L 53/11* (2019.02); *B60L 53/22* (2019.02); *H02J 7/022* (2013.01); *H02M 3/158* (2013.01); *H02M 3/285* (2013.01); *H02M 2001/0074* (2013.01); *H02M 2001/0083* (2013.01); *Y02T 90/12* (2013.01)

(58) Field of Classification Search
CPC .... H02J 7/022; H02J 7/04; H02J 7/007; H02J 7/0063; H02J 7/0052; H02J 7/02; B60L 53/11; B60L 53/22; B60L 53/20; H02M 3/285; H02M 3/158

USPC .......................... 320/104, 109, 128, 140, 142
See application file for complete search history.

(56) References Cited

U.S. PATENT DOCUMENTS

2013/0134935 A1    5/2013    Maitra et al.

OTHER PUBLICATIONS

Mohammadpour Ali et al: "Series-Input Parallel-Output Modular-Phase DC-DC Converter with Soft Switching and High Frequency Isolation," IEEE Transactions on Power Electronics, Institute of Electrical and Electronics Engineers, USA, vol. 31, No. 1, Jan. 1, 2016 (Jan. 1, 2016), pp. 111-119, XP011669828

(Continued)

*Primary Examiner* — Edward Tso
(74) *Attorney, Agent, or Firm* — JCIP; Joseph G. Chu; Jeremy I. Maynard

(57) ABSTRACT

An electric system to charge a battery on a vehicle provides for a three-phase alternating-direct converter comprising input terminals connected to an outside power grid, a high output terminal and a low output terminal, a direct-direct converter made up of two direct-direct converter circuits, a first converter circuit having a high input terminal connected to the high output terminal of the alternating-direct converter and a second converter circuit having a low input terminal connected to the low output terminal of the alternating-direct converter, the low input terminal of the first direct-direct converter circuit being connected to the high input terminal of the second direct-direct converter circuit, and the high output terminal of the first converter circuit being connected to the high output terminal of the second converter circuit and the low output terminal of the first converter circuit being connected to the low output terminal of the second converter circuit.

13 Claims, 3 Drawing Sheets

(51) Int. Cl.
*B60L 53/22* (2019.01)
*B60L 53/10* (2019.01)
*H02M 1/00* (2006.01)

(56) References Cited

OTHER PUBLICATIONS

Preliminary Search Report of Application FR1752862 dated Nov. 21, 2017.

ELECTRIC CHARGER SYSTEM FOR ELECTRIC OR HYBRID VEHICLE

RELATED APPLICATION

This application claims priority to, and the benefit of, French Patent Application No. FR1752862 with the filing date of Apr. 3, 2017, the content of which is incorporated by reference in its entirety herein.

TECHNICAL FIELD

In general, the invention relates to an electric system for charging electricity storage units, in particular one such electrical system on board a motor vehicle, in particular an electric or hybrid motor vehicle.

More specifically, in the context of an electric or hybrid vehicle comprising at least one battery powering a traction motor of the vehicle, it is known for an onboard charger system, commonly referred to as an onboard charger (OBC), to be implemented. In this context, the present invention in particular relates to an electrical system forming an improved on board charger, able to work optimally both when it is connected to a three-phase power grid and when it is powered by a single-phase power grid.

SUMMARY

As is known, an electric or hybrid vehicle comprises an electrical motorization system powered by a high-voltage battery via a high-voltage onboard power grid and a plurality of pieces of auxiliary electrical equipment powered by a low-voltage battery via a low-voltage on board power grid. Thus, the high-voltage battery supplies energy to the electric motorization system, allowing propulsion of the vehicle. The low-voltage battery powers pieces of auxiliary electrical equipment, such as onboard computers, window regulator motors, a multimedia system, etc. The high-voltage battery typically delivers 100 V to 900 V, preferably 100 V to 500 V, while the low-voltage battery typically delivers 12 V, 24 V or 48 V. Said two high- and low-voltage batteries must be able to be charged.

The high-voltage battery is electrically recharged by connecting it, via a high-voltage power grid of the vehicle, to an outside power grid, for example the household alternating power grid. In practice, depending on whether it involves a recharging terminal dedicated to recharging electric or hybrid vehicle batteries or the household alternating power grid, said outside power grid may be a three-phase or single-phase grid.

A three-phase outside power grid allows faster recharging of the high-voltage battery of the vehicle. However, such a three-phase grid is not always available, and the on board charger system, called OBC system, must make it possible to charge the high-voltage battery, including when the outside power grid is a single-phase grid.

In general, as is known, OBC systems primarily comprise an alternating-direct converter and a direct-direct converter, preferably galvanically isolated. The alternating-direct converter is generally called a power factor correction (PFC) alternating-direct converter. The alternating-direct converter PFC, in its power factor correction function, eliminates the deformations of the power grid on the absorbed current to avoid the appearance of harmonic currents harmful to the outside power grid. The alternating-direct converter PFC thus makes it possible to put the current and the input voltage in phase.

The general issue, in the context of the present invention, consequently relates to designing an electric charger system allowing three-phase and single-phase operation.

According to the state of the art, to allow charging of a battery from an outside power grid that may have three phases or one phase, it is known to use an electrical system comprising three AC/DC single-phase alternating-direct converters each connected to a respective DC/DC single-phase direct-direct converter, as shown in FIG. 1.

This solution has the advantage of allowing a vehicle battery to be charged from a single-phase or three-phase outside power grid, with great usage flexibility and electrical performance. However, the number of components needed, in particular the multiplication of converters, considerably increases the cost and bulk of such electrical systems. It is consequently necessary to develop a more compact and cost-effective solution.

Furthermore, it should be noted that, in this topology, the presence of a neutral branch N is necessary to balance the branches a, b, c of the AC/DC alternating-direct converters.

One known solution, to that end, consists of implementing an OBC system made up of a single three-phase alternating-direct converter PFC connected to a direct-direct converter LLC, as shown in FIG. 2. As is known, said direct-direct converter LLC typically consists of an isolated resonant circuit comprising a primary circuit P and a secondary rectifier circuit RD.

However, although the compactness is naturally better, the single-phase efficiency is very low, inasmuch as only two branches of the alternating-direct converter are used, the system operating at best at one third of its theoretical power.

With the aim of improving the performance of electric charger systems, inasmuch as they allow charging of a battery from a three-phase or single-phase outside power grid optimally while preserving their compactness, the present invention proposes an electric charger system comprising an alternating-direct converter, typically a three-phase alternating-direct converter PFC and a direct-direct converter comprising two direct-direct converter circuits connected in series with the three-phase alternating-direct converter PFC and in parallel at the output.

BRIEF DESCRIPTION OF THE INVENTION

More specifically, the invention relates to an electric charger system intended to charge a battery from an outside power grid, in particular intended to be on board an electric or hybrid vehicle to charge battery, driving the vehicle, from a power grid outside said vehicle, said electric system comprising:

a three-phase alternating-direct converter comprising input terminals intended to be connected to an outside power grid, a high output terminal and a low output terminal, a direct-direct converter, said direct-direct converter having two direct-direct converter circuits, a first direct-direct converter circuit having a high input terminal connected to the high output terminal of the alternating-direct converter and a second direct-direct converter circuit having a low input terminal connected to the low output terminal of the alternating-direct converter, the low input terminal of the first direct-direct converter circuit being connected to the high input terminal of the second direct-direct converter circuit, the high output terminal of the first converter circuit being connected to the high output terminal of the second direct-direct converter circuit and the low output terminal of the first converter circuit being connected to the low output terminal of the second direct-direct converter circuit.

Owing to the electric system according to the invention, an electric charger system is proposed, in particular for charging a vehicle battery, that is compact and efficient in both three-phase and single-phase situations.

Furthermore, to control the electric charger system according to the invention, it is necessary to have only one control unit for the three-phase alternating-direct converter part and only one control unit for the direct-direct converter part.

According to one embodiment, the direct-direct converter is configured so that, in a three-phase operating mode, said first and second direct-direct converters receive current delivered by the alternating-direct converter, and so that, in a single-phase operating mode, only one of said first and second direct-direct converter circuits receives current delivered by the alternating-direct converter.

Advantageously, the system comprises at least one switch configured to short-circuit the input of one of said first and second direct-direct converter circuits in the single-phase operating mode.

Advantageously, said switch connects the high output terminal of the alternating-direct converter or the low output terminal of the alternating-direct converter to the connection point between the low input terminal of the first direct-direct converter circuit and the high input terminal of the second converter circuit, and in which, in the single-phase operating mode, the switch is on so as to short-circuit the input of the direct-direct converter circuit between the input terminals of which the switch is connected.

Advantageously, each voltage converter circuit comprises a primary circuit and a secondary circuit, said primary circuit being connected in series between the high output terminal and the low output terminal of the three-phase alternating-direct converter, and said secondary circuit being connected in parallel, between a high output terminal and a low output terminal of said direct-direct converter.

According to one embodiment, said first and second direct-direct converter circuits each consist of a resonant circuit.

Advantageously, said first and second direct-direct converter circuits are configured to operate with interleaving.

According to one embodiment, said first and second direct-direct converter circuits are configured to operate with interleaving in the three-phase operating mode.

According to one embodiment, said first and second direct-direct converter circuits are also phase-shifted by 90°.

In this case, the direct-direct converter part is naturally balanced. Furthermore, the wave current is naturally reduced.

According to one embodiment, the three-phase alternating-direct converter comprises at least one inductance per phase, each inductance having a first terminal forming an input terminal of the alternating-direct converter, and a second terminal connected to an arm, said arm being connected between the high output terminal and the low output terminal of the alternating-direct converter of the three-phase alternating-direct converter.

In one embodiment, each arm comprises two switches so as to connect the corresponding inductance on the one hand to the high output terminal of the alternating-direct converter, via the respective switch, and on the other hand to the low output terminal of the alternating-direct converter, via a respective switch.

According to one alternative embodiment, the three-phase alternating-direct converter comprises a Vienna-type circuit and an intermediate output terminal.

Advantageously, the direct-direct converter circuit that is not short-circuited by the switch comprises a capacitive arm connected between the high input terminal and the low input terminal of said direct-direct converter circuit, the system including a second switch connected to the intermediate output terminal and configured so as, in the three-phase operating mode, to connect the intermediate output terminal with the connection point between the two direct-direct converter circuits; and, in the single-phase operating mode, so as to connect the intermediate output terminal with a midpoint of the capacitive arm of the direct-direct converter that is not short-circuited by the switch.

According to one embodiment, the direct-direct converter is galvanically isolated.

BRIEF DESCRIPTION OF THE DRAWINGS

The invention will be better understood upon reading the following description, provided solely as an example, and in reference to the appended drawings, in which.

DETAILED DESCRIPTION OF THE INVENTION

It is recalled that the present invention is described below using different non-limiting embodiments and may be implemented in alternatives within the reach of one skilled in the art, also targeted by the present invention.

Figure 1:
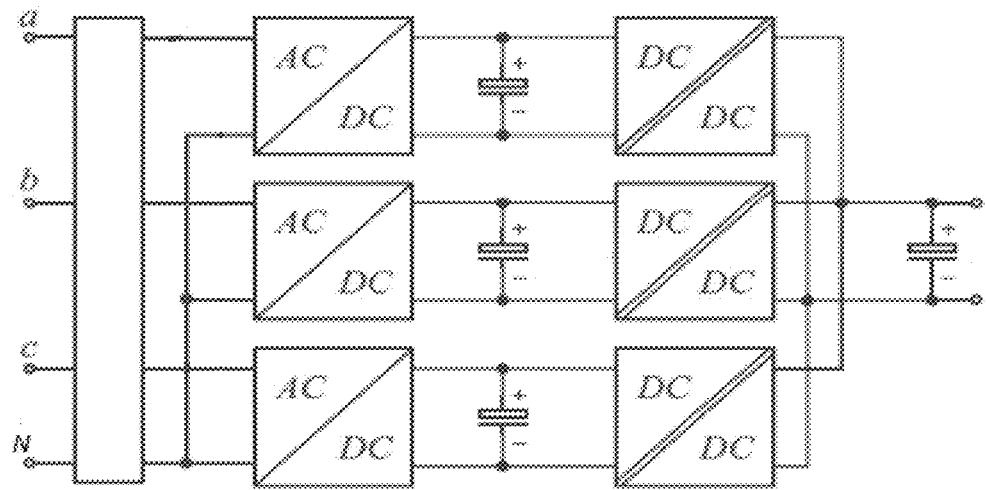
FIG. 1 is the functional diagram of a three-phase OBC system according to the state of the art.
Figure 2:
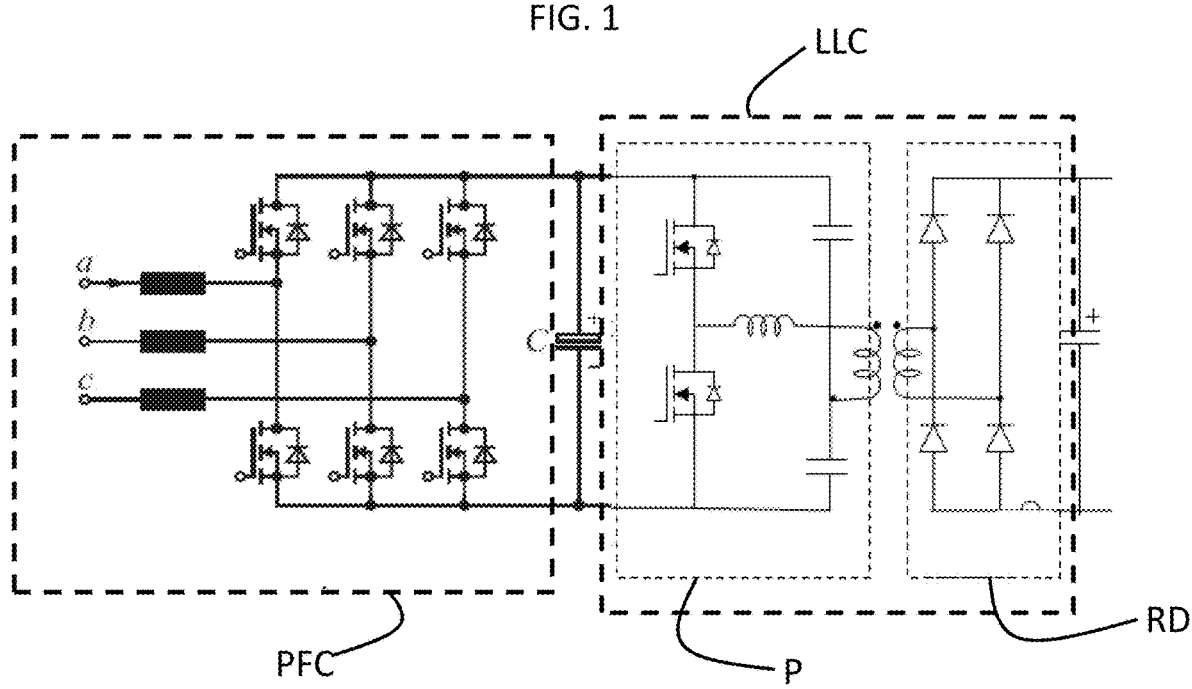
FIG. 2 is the functional diagram of another example three-phase OBC system according to the state of the art.
Figure 3:
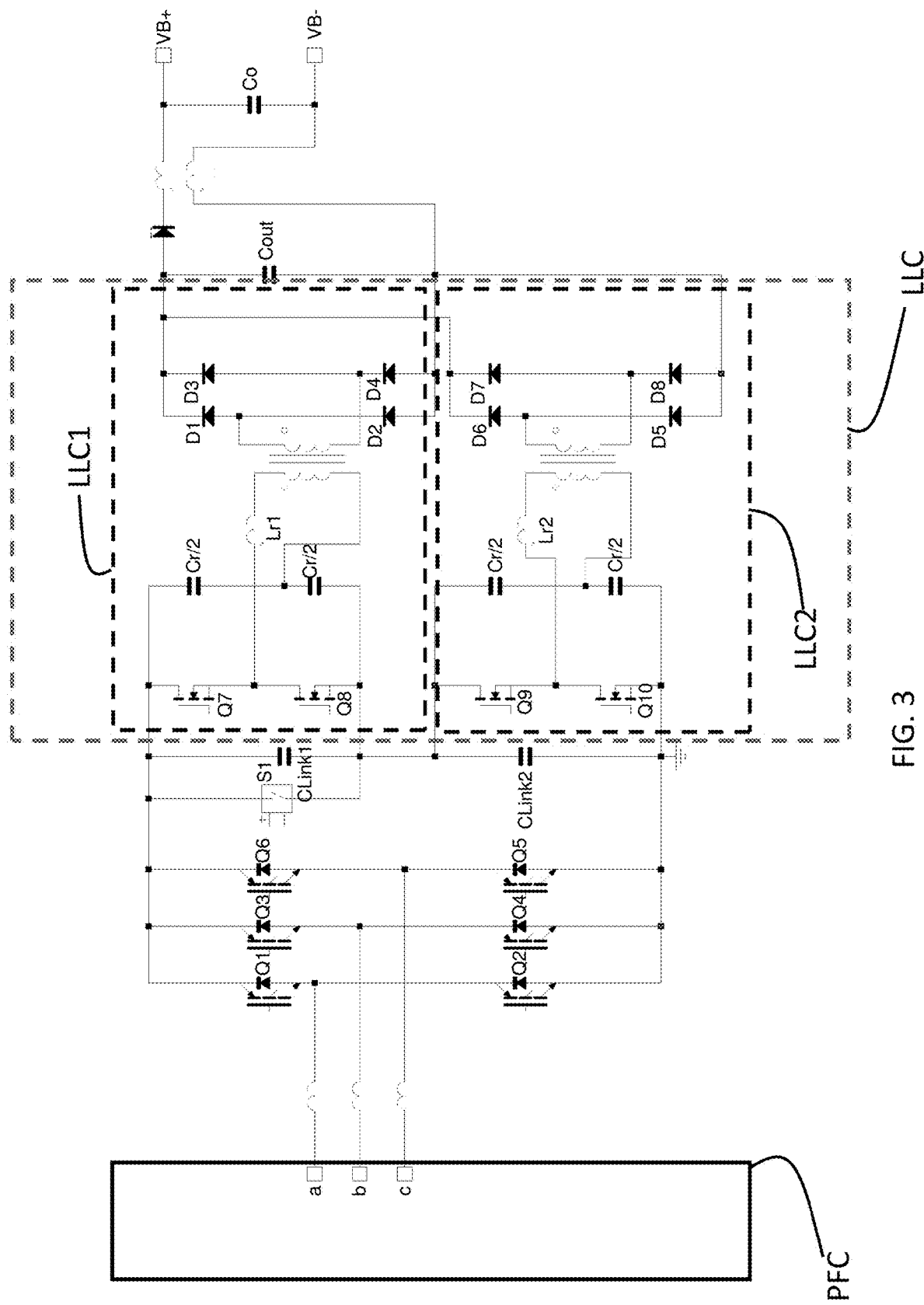
FIG. 3 is the simplified electronic diagram of an electric system according to the invention, in a first embodiment.

In reference to FIG. 3, an example electric system according to the invention is shown, intended to charge a battery of a vehicle, in particular an electric or hybrid vehicle, connected to its output terminals VB+, VB−.

Such an electric system comprises an alternating-direct converter with power factor correction having three branches a, b, c, called three-phase alternating-direct converter PFC. The three-phase converter PFC is configured to be connected to an outside power grid (not shown), which may be a three-phase or single-phase grid. A three-phase outside power grid allows faster recharging. A single-phase power grid has the advantage of being able to be a household alternating power grid, typically available in the homes of individual users of electric or hybrid vehicles.

The alternating current is rectified and a direct current is delivered at the output of the alternating-direct converter PFC. Each branch a, b, c of the alternating-direct converter PFC is connected to a high output terminal and a low output terminal, respectively. At least one switching element Q1, Q2, Q3, Q4, Q5, Q6, such as an Isolated Gate Bipolar Transistor (IGBT), or a Metal Oxide Semiconductor Field Effect Transistor (MOSFET), is placed in each branch between said high and low output terminals. More specifically, the three-phase alternating-direct converter PFC comprises at least one inductance per phase, each phase in particular corresponding to a branch a, b, c. Each inductance has a first terminal, forming an input terminal of the alternating-direct converter PFC, and a second terminal connected to an arm, said arm being connected between the high output terminal and the low output terminal of the alternating-direct converter of the three-phase alternating-direct converter PFC. In the embodiment shown in FIG. 3, each arm comprises two switches Q1, Q2, Q3, Q4, Q5, Q6 so as to connect the corresponding inductance on the one hand to the high output terminal of the PFC alternating-direct converter, via a respective switch, and on the other hand to the low output terminal of the alternating-direct converter PFC, via a respective switch.

Two direct-direct converter circuits LLC1, LLC2, in the case at hand formed by two isolated resonant circuits LLC1, LLC2, are connected at the output of the alternating-direct converter PFC, to form a direct-direct converter LLC.

Said direct-direct converter circuits LLC1, LLC2 are connected in series at the input, the input terminals of each direct-direct converter circuit being connected to the output terminals of the alternating-direct converter PFC. In other words, the three-phase alternating-direct converter PFC comprises input terminals intended to be connected to an outside power grid, a high output terminal and a low output terminal. A first direct-direct converter circuit LLC1 has a high input terminal connected to the high output terminal of the alternating-direct converter and a second direct-direct converter circuit LLC2 has a low input terminal connected to the low output terminal of the three-phase alternating-direct converter PFC. The low input terminal of the first direct-direct converter circuit LLC1 is also connected to the high input terminal of the second direct-direct converter circuit LLC2, and the high output terminal of the first direct-direct converter circuit LLC1 is connected to the high output terminal of the second direct-direct converter circuit LLC2, the low output terminal of the first converter circuit LLC1 being connected to the low output terminal of the second direct-direct converter circuit LLC2.

Owing to this topology in which the two resonant circuits LLC1, LLC2, serving as direct-direct converters, are symmetrical, with a same input voltage and a same imposed output voltage, the voltage at the midpoint of the voltage converter circuits is naturally balanced.

In practice, according to the embodiment of FIG. 3, corresponding to traditional implementations of resonant circuits LLC1, LLC2, said resonant circuits are galvanically isolated and comprise a primary circuit with controlled switches Q7, Q8 for the resonant circuit LLC1, Q9, Q10 for the resonant circuit LLC2, respectively, with resonance capacities Cr/2 and resonance inductances Lr1, Lr2, respectively. Furthermore, the isolated resonant circuits LLC1, LLC2 comprise, at the secondary, a rectifying part formed by the diodes D1, D2, D3, D4 for the resonant circuit LLC1 and D5, D6, D7, D8 for the resonant circuit LLC2.

Each direct-direct converter circuit LLC1, LLC2 then comprises a primary circuit and a secondary circuit, said primary circuit being connected in series between the high output terminal and the low output terminal of the three-phase alternating-direct converter PFC, and said secondary circuit being connected in parallel, between a high output terminal and a low output terminal of said direct-direct converter LLC.

Furthermore, said two direct-direct converter circuits LLC1, LLC2 preferably operate with interleaving. Furthermore, according to one preferred embodiment, said direct-direct converter circuits LLC1, LLC2 are phase-shifted by 90°.

Figure 4:
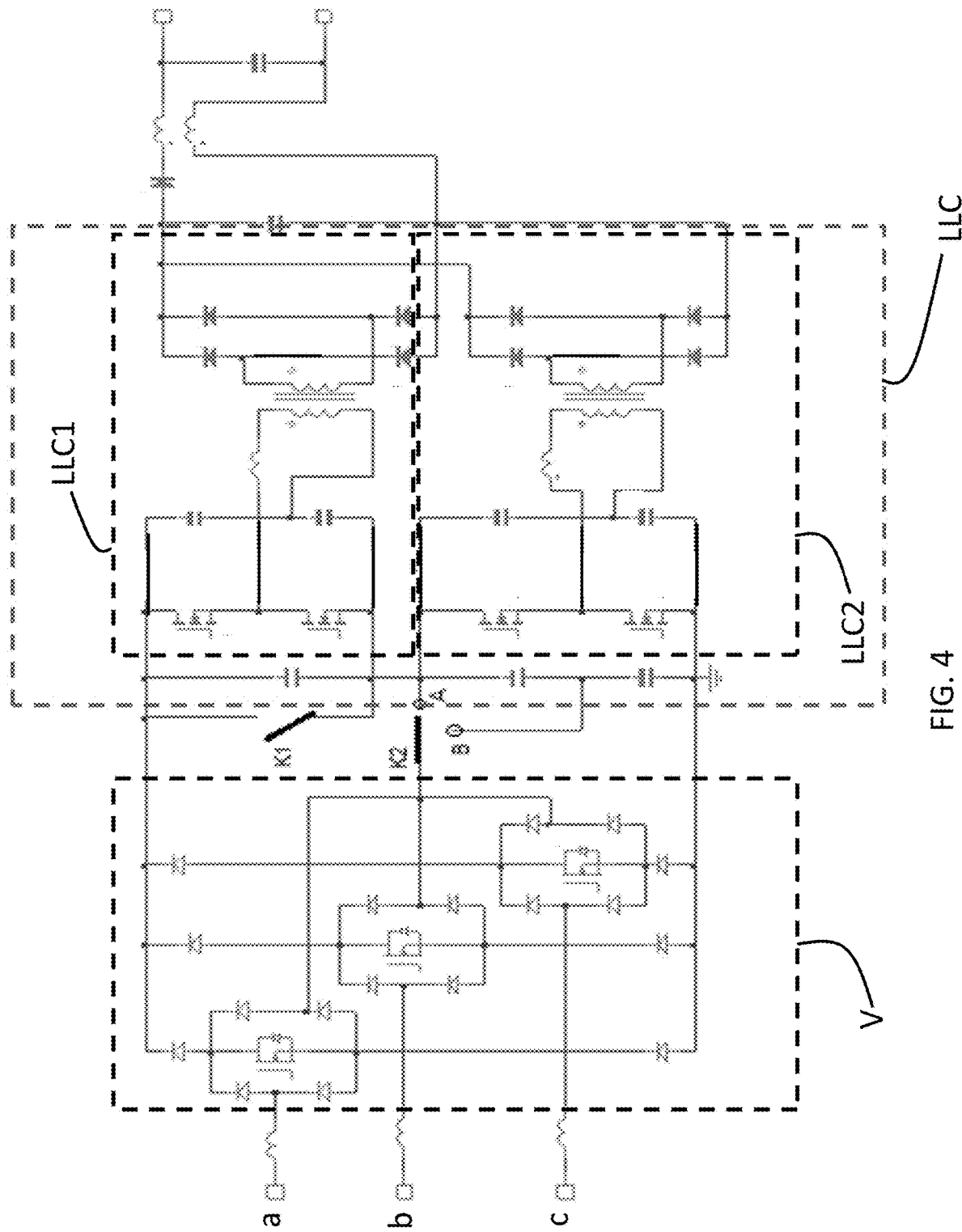
FIG. 4 is the simplified electronic diagram of an electric system according to the invention, in a second embodiment.

According to the invention, a means is provided for short-circuiting one of the direct-direct converter circuits LLC1 or LLC2 when the three-phase alternating-direct converter PFC is connected to a single-phase outside power grid. In reference to FIG. 3, a switch S1 is also connected between the high output connection point or the low output connection point of the alternating-direct converter PFC and the midpoint of the voltage converter circuits. This switch S1 thus makes it possible, when it is commanded to the on state, to short-circuit one of the direct-direct converter circuits LLC1, LLC2. In FIG. 4, the circuit LLC1 can be short-circuited, but it is of course possible to configure the system so that the resonant circuit able to be short-circuited is the resonant circuit LLC2.

Alternatively, in place of a dedicated switch S1, the switches Q7, Q8 or Q9, Q10 can respectively be commanded to short-circuit one of the direct-direct converter circuits LLC1, LLC2.

The capacitances Clink1, Clink2 situated between the input terminals of the first voltage converter circuit LLC1 and between the terminals of the second converter circuit LLC2 serve to attenuate the ripples of the voltage delivered to the direct-direct converter circuits LLC1, LLC2.

As previously mentioned, the present invention makes it possible to benefit from a high efficiency of the electric charger system, whether the outside power grid powering the converters PFC is a three-phase or single-phase grid.

In the first example embodiment, in the three-phase operating mode, the electric charger system according to the invention is configured so that the two direct-direct converter circuits LLC1, LLC2 receive current delivered by the alternating-direct converter PFC. According to the preferred embodiment of FIG. 3, the switch S1 is thus commanded to the off state. The three-phase alternating-direct converter PFC operates at full power on all three of its branches and symmetrically delivers half of this power to each direct-direct converter circuit LLC1, LLC2.

For example, for an application representative of an electric vehicle charger system, each phase of the alternating-direct converter PFC can handle a current of 10 A, the total power delivered by the three-phase alternating-direct converter PFC being about 7 kW and the voltage across the output terminals of the alternating-direct converter made up of the three converters PFC is typically comprised between 680 V and 870 V. Each direct-direct converter LLC1, LLC2 receives a power of 3.5 kW [and] supplies a current of 12 A, such that a current of 24 A is obtained at the output of the direct-direct converter made up of the two direct-direct converter circuits LLC1, LLC2, with a voltage comprised between 220 V and 470 V.

In the single-phase operating mode, the electric charger system according to the invention is configured so that only one of the two direct-direct converter circuits LLC1, LLC2 receives current delivered by the alternating-direct converter PFC. In the case at hand, still according to the embodiment of FIG. 3, the switch S1 is commanded to the on state. One of the direct-direct converter circuits, in the case at hand the direct-direct converter circuit LLC1, is short-circuited. Two branches of the three-phase alternating-direct converter PFC are used to deliver a voltage to the active direct-direct converter circuit, in the case at hand LLC2.

To continue the above application, a single current of 10 A is delivered here. The total power delivered by the three-phase alternating-direct converter PFC is typically about 2.2 kW and the voltage across the output terminals of the three-phase alternating-direct converter PFC is typically comprised between 340 V and 435 V. The second direct-direct converter circuit LLC2—the first direct-direct converter circuit LLC1 being short-circuited—receives the power of 2.2 kW, such that one obtains a current of 8 A at the output of the LLC direct-direct converter, with an output voltage comprised between 220 V and 470 V.

Furthermore, it should be noted that in the electric charger system according to the invention, the ripple current circulating in the output capacitance Cout shared by the two direct-direct voltage converters LLC1, LLC2, is reduced. The noise is also reduced, which allows the implementation of lower capacitances Cout, $C_0$ at the output of the electric charger system.

FIG. 4 shows a second example embodiment of the electric charger system according to the invention, in which the three-phase alternating-direct converter is a Vienna-type circuit V.

At the output of the Vienna-type circuit V, two switches are connected: the switch K1 makes it possible to short-circuit a direct-direct converter circuit LLC1. In FIG. 4, the first direct-direct converter circuit LLC1 can be short-circuited, but it is of course possible to configure the system so that the resonant circuit able to be short-circuited is the second direct-direct converter circuit LLC2.

The second switch K2 makes it possible to deliver a current coming from the Vienna-type circuit V, taken at a midpoint M of said Vienna-type circuit V. The second direct-direct converter circuit comprises a capacitive arm connected between the high input terminal and the low input terminal of the second direct-direct converter circuit LLC2, and the second switch K2, connected to the intermediate output terminal, is configured so as, in the three-phase operating mode, to connect the intermediate output terminal with the connection point between the two direct-direct converter circuits LLC1, LLC2 (position A); and, in the single-phase operating mode, so as to connect the intermediate output terminal with a midpoint of the capacitive arm of the second direct-direct converter circuit LLC2 (position B).

The three-phase and single-phase operating modes of this second example embodiment are otherwise identical to what has been described for the first example embodiment. The only difference is that the switch K2 is therefore in position A in the three-phase operating mode and in position B in the single-phase operating mode.

It should be noted that one advantage procured by the use of a three-phase alternating-direct converter PFC or a Vienna-type circuit V also lies in the fact that, in the three-phase operating mode, it is not necessary to have a connection to a neutral conductor of the outside power grid.

It is also recalled that the embodiments described above are not limiting and that the present invention may be implemented in alternative embodiments within the reach of one skilled in the art.

What is claimed is:

1. An electric charger system intended to charge a battery from an outside power grid, in particular intended to be on board an electric or hybrid vehicle to charge battery, driving the vehicle, from a power grid outside said vehicle, said electric system comprising:
   a three-phase alternating-direct converter comprising input terminals intended to be connected to an outside power grid, a high output terminal and a low output terminal,
   a direct-direct converter, said direct-direct converter having two direct-direct converter circuits, a first direct-direct converter circuit having a high input terminal connected to the high output terminal of the alternating-direct converter and a second direct-direct converter circuit having a low input terminal connected to the low output terminal of the alternating-direct converter,
   the low input terminal of the first direct-direct converter circuit being connected to the high input terminal of the second direct-direct converter circuit, and
   the high output terminal of the first converter circuit being connected to the high output terminal of the second direct-direct converter circuit and the low output terminal of the first converter circuit being connected to the low output terminal of the second direct-direct converter circuit,
   wherein said direct-direct converter is configured so that, in a three-phase operating mode, said first and second direct-direct converters receive current delivered by the alternating-direct converter, and so that, in a single-phase operating mode, only one of said first and second direct-direct converter circuits receives current delivered by the alternating-direct converter.

2. The electric charger system according to claim 1, comprising at least one switch configured to short-circuit the input of one of said first and second direct-direct converter circuits in the single-phase operating mode.

3. The electric charger system according to claim 2, wherein said switch connects the high output terminal of the alternating-direct converter or the low output terminal of the alternating-direct converter to the connection point between the low input terminal of the first direct-direct converter circuit and the high input terminal of the second converter circuit, and in which, in the single-phase operating mode, the switch is on so as to short-circuit the input of the direct-direct converter circuit between the input terminals of which the switch is connected.

4. The electric charger system according to claim 1, wherein each direct-direct converter circuit comprises a primary circuit and a secondary circuit, said primary circuit being connected in series between the high output terminal and the low output terminal of the three-phase alternating-direct converter, and said secondary circuit being connected in parallel, between a high output terminal and a low output terminal of said direct-direct converter.

5. The electric charger system according to claim 4, wherein said first and second direct-direct converter circuits each consist of a resonant circuit.

6. The electric charger system according to claim 1, wherein said first and second direct-direct converter circuits are configured to operate with interleaving.

7. The electric charger system according to claim 6, wherein said first and second direct-direct converter circuits are configured to operate with interleaving in the three-phase operating mode.

8. The electric charger system according to claim 6, wherein said first and second direct-direct converter circuits are phase-shifted by 90°.

9. The electric charger system according to claim 1, wherein the three-phase alternating-direct converter comprises at least one inductance per phase, each inductance having a first terminal forming an input terminal of the alternating-direct converter, and a second terminal connected to an arm, said arm being connected between the high output terminal and the low output terminal of the alternating-direct converter of the three-phase alternating-direct converter.

10. The electric charger system according to claim 9, wherein each arm comprises two switches so as to connect the corresponding inductance on the one hand to the high output terminal of the alternating-direct converter, via a respective switch, and on the other hand to the low output terminal of the alternating-direct converter, via a respective switch.

11. The electric charger system according to claim 1, wherein the three-phase alternating-direct converter comprises a Vienna-type circuit and an intermediate output terminal.

12. The electric charger system according to claim 11,
wherein the direct-direct converter is configured so that, in a three-phase operating mode, said first and second direct-direct converters receive current delivered by the alternating-direct converter, and so that, in a single-phase operating mode, only one of said first and second direct-direct converter circuits receives current delivered by the alternating-direct converter;
wherein at least one switch configured to short-circuit the input of one of said first and second direct-direct converter circuits in the single-phase operating mode; and
wherein the direct-direct converter circuit that is not short-circuited by the switch comprises a capacitive arm connected between the high input terminal and the low input terminal of said direct-direct converter circuit,
the system including a second switch connected to the intermediate output terminal and configured so as, in the three-phase operating mode, to connect the intermediate output terminal with the connection point between the two direct-direct converter circuits; and, in the single-phase operating mode, so as to connect the intermediate output terminal with a midpoint of the capacitive arm of the direct-direct converter that is not short-circuited by the switch.

13. The electric charger system according to claim 1, wherein the direct-direct converter circuit is galvanically isolated.

* * * * *